Aug. 29, 1950      A. B. BATCHELDER      2,520,488
LAWN RENOVATING MACHINE
Filed Sept. 20, 1948      2 Sheets-Sheet 1
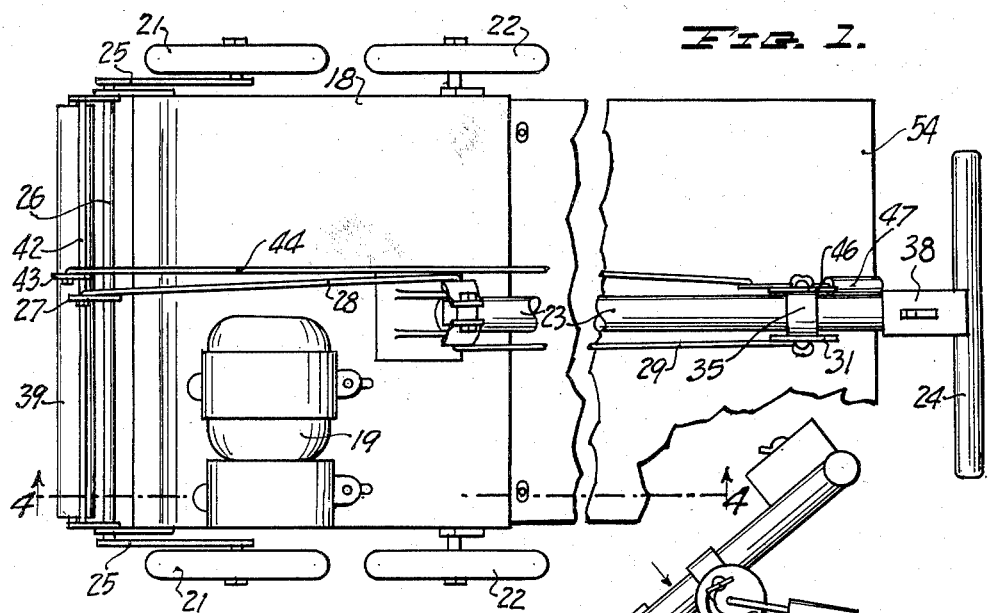
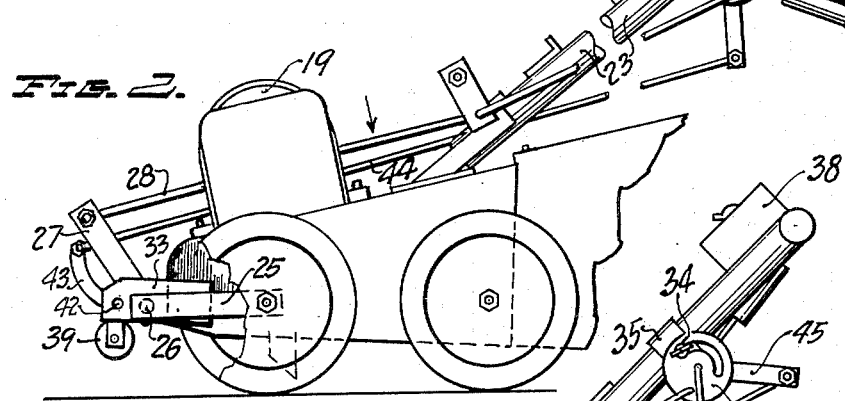
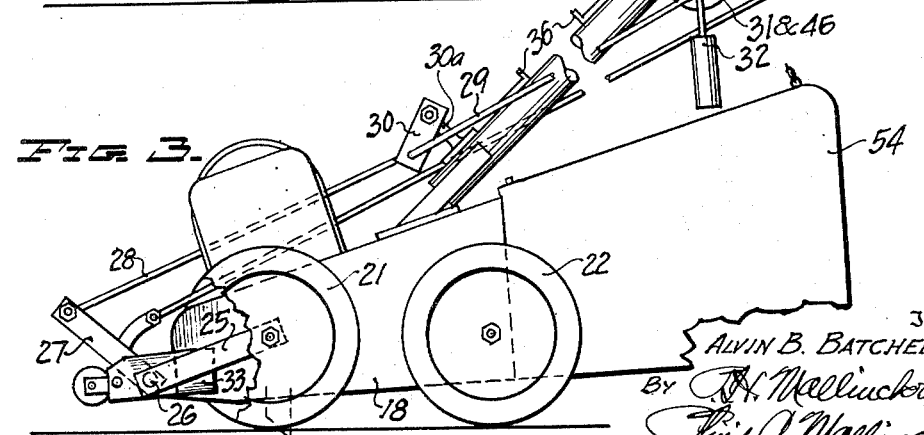

Aug. 29, 1950 — A. B. BATCHELDER — 2,520,488
LAWN RENOVATING MACHINE
Filed Sept. 20, 1948 — 2 Sheets-Sheet 2
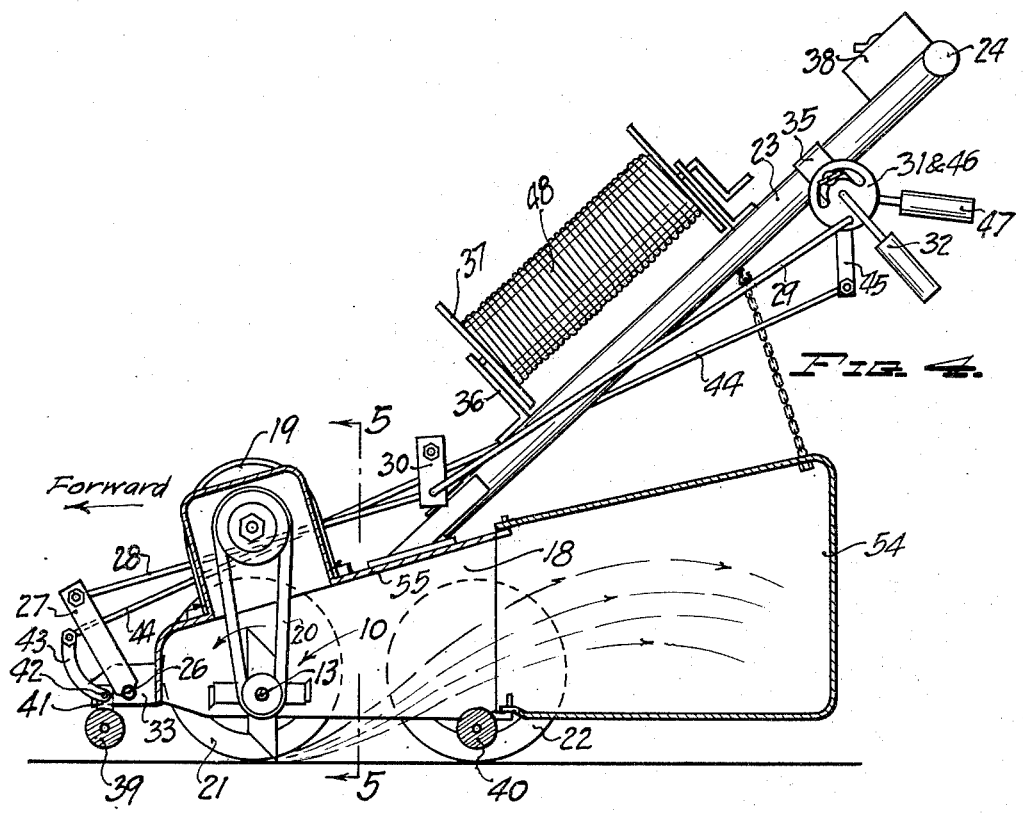
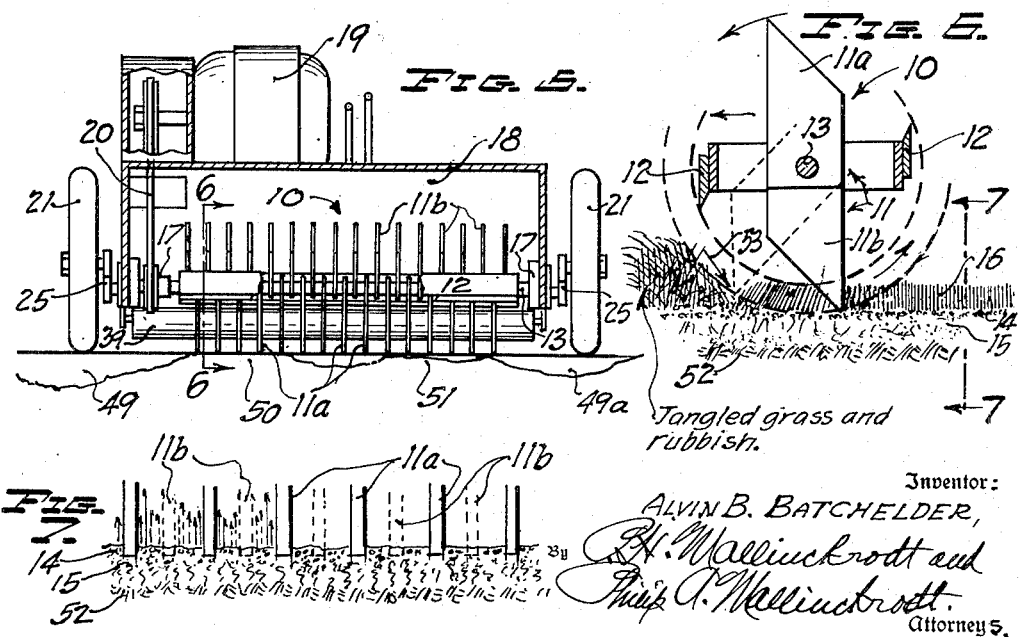
Inventor:
ALVIN B. BATCHELDER

Patented Aug. 29, 1950

2,520,488

UNITED STATES PATENT OFFICE 2,520,488

LAWN RENOVATING MACHINE

Alvin B. Batchelder, Ogden, Utah

Application September 20, 1948, Serial No. 50,212

5 Claims. (Cl. 56—289)

This invention relates to a lawn renovating machine of which the principal objects are:

(a) To maintain lawn grass in a beautiful and healthy state of growth;

(b) To effectively clean and dress lawns;

(c) To exert a combing action upon the blades of lawn grass upwardly from within the crown zone of the root system thereof, thus effectually straightening any tangled or matted blades so as to expose these effectually to the clipping action of a revolving sickle bar;

(d) To eliminate weeds and other objectionable growths;

(e) To provide a light cultivating action inexpensively at proper intervals thereby invigorating the root system of the grass and encouraging the constant formation of a live, massed growth of new grass;

(f) To remove rubbish, dead grass and other objectionable items which ordinarily are not readily reached;

(g) To require considerably less water than usual in the maintenance of a lawn although at the same time establishing a better growth of grass.

Other objects will become evident as the following description progresses.

In accomplishing the purpose of the invention, a rotatable renovator head is employed which comprises first, a series of oppositely directed staggered, finger teeth spaced alternately apart along an axis of rotation, the consecutive teeth being in planes spaced along the rotative axis; and second, one or more oppositely positioned sickle bars extending axially of the rotative axis. The sickle bars are substantially plane, the plane being substantially perpendicular to a radius, and properly spaced apart from the rotative axis so as to be located radially somewhat within the tips of the aforementioned finger teeth. Thus the teeth act to erect grass blades from the roots at points a little below the soil surface after which the sickles almost instantaneously clip the erected blades practically uniformly.

In operation, the renovating head is rotated with extreme rapidity, for example, 1400 R. P. M. or more, with the result that the points of the radial finger teeth revolve in planes spaced closely together transversely of the line of travel of the machine, while at the same time the benefit of a wider axial spacing of the finger teeth is attained at each revolution. This permits a close stirring of the soil without the disadvantages of finger teeth spaced axially close together.

In the accompanying drawing, which illustrates one desirable embodiment of the invention, Fig. 1 represents a plan view, parts being broken away for convenience; and other parts in the foreground omitted;

Fig. 2, a side elevation, showing the renovator head and related parts in a retracted position;

Fig. 3, a side elevation showing the renovator head in an alternative, operating position;

Fig. 4, a section taken on the line 4—4 in Fig. 1, the renovator head being in still another alternative position;

Fig. 5, a cross-section taken on the line 5—5 in Fig. 4;

Fig. 6, a section taken on the line 6—6 in Fig. 5, drawn to an enlarged scale and showing more clearly the construction of the renovator head; and Fig. 7, a section taken on line 7—7, Fig. 6, and drawn to an enlarged scale.

Referring to the drawing, the numeral 10 denotes a rotatable renovator head which comprises, as chief members thereof, finger teeth 11 and sickle blades 12, all mounted together for cooperative functioning as a unit.

In this instance the finger teeth 11 are radially fixed on a shaft 13 preferably in two oppositely extending groups or sets 11a and 11b. In each of the two sets, the individual finger teeth are spaced apart one from another along the shaft 13, and preferably the two sets 11a and 11b are spaced apart equally, see Fig. 5.

The net operative result of the arrangement described, is illustrated in Fig. 7. Here, in the rotation of the renovator head 10, only one set of finger teeth, for example teeth 11a, will be sunk in crown zone 14 at one instant, while in the next instant the teeth 11b will be similarly sunk, but at no time will both sets be sunk at the same instant. This means that the crown zone is not unduly disturbed because there is sufficient space transversely between adjacent teeth so as to eliminate the wedging action which tends to be exerted upon the material between, if the spacing is close. The root zone is indicated at 15 and the finished lawn, after treatment, at 16, Fig. 6.

In this instance the renovator head 10 is rotatably mounted at 17, in a housing 18, Fig. 5, and is driven by an electric motor 19 through a belt 20. Housing 18 is mounted on front wheels 21 and on rear wheels 22, all wheels being preferably rubber tired. A tongue 23 fixed on the housing has a handle cross-bar 24 arranged so as to be easily grasped by a user.

In order to regulate the operation of the renovator head, front wheels 21 are rotatably mounted at the ends of oscillating arms 25 which in turn are fixed on a shaft 26, the latter being journaled in outboard brackets 33 that extend rigidly from housing 18. By rocking shaft 26, the housing is raised or lowered with respect to wheels 21, thereby regulating the position of the renovator head accordingly. This rocking is effected by means of an arm 27 which has a fixed angular relation to arms 25. Arm 27 belongs to a leverage assembly that includes rods 28 and 29, intermediate hanger 30 and a slotted disk 31, the latter having a handle 32 rigidly attached thereto. By rocking handle 32, the renovator head is raised or lowered as the case may be, and is optionally locked by means of a set screw 34 that engages the near depending leg of a U-clip 35. In the present instance it is desirable that the rods 28 and 29 skirt the lower part of frame 36 in which is mounted a rotatable reel 37, the latter having wound thereon an electric service cable 48 that connects a switch 38 with the motor 19. It is deemed unnecessary to show detailed electrical connections, since such connections are well known.

When using the machine on uneven ground, wheels 21 and 22 are liable to drop into depressions and so interfere with the functioning of the renovator head. To obviate this, front guard rollers 39 and rear guard rollers 40 are provided, the former being preferably movable and the latter fixed relatively to the housing 18. The movable roller is mounted in short arms 41 so as to be rotatable in these arms, which in turn are fixed on a shaft 42. This shaft is rotatable in the aforementioned brackets 33.

An arm 43 is fixed on shaft 42 and is connected by means of a rod 44 with another arm 45, the latter being fixed on a disk 46 that is rotatably held in the far depending leg of the clip 35. A handle 47 is fixed on disk 46, so that rocking of handle 47 changes the position of roller 39, different positions being illustrated in Figs. 2, 3 and 4. The depth to which the renovator teeth penetrate the crown zone, Figs. 3 and 7, is thus accurately determinable.

In using the machine, conductor cable 48 is connected to any convenient electric outlet (not shown) and is paid out as the user pushes the machine forward. Meanwhile, the motor 19 is started by means of switch 38, the user manipulating the renovator head as required, by means of handle 32 and then clamping the latter, for which purpose set screw 34 is provided. Since guard roller 39 is mounted as a part of, and moves with, housing 18, it is always in position to be used whenever uneven ground is encountered.

The utility of the guard rollers is clearly indicated in Fig. 5, where, if wheels 21 should drop into depressions such as 49 and 49a, the combs of renovator head 10 would be allowed to penetrate the higher portions 50 of surface 51, only to the depth determined by any particular setting of the guard rollers, that is to say, in this instance, until roller 39 sinks and rides on portions 50 and 51. In this illustration the roller has just cleared the depressions.

In Figs. 4 and 6 it is observed that the renovator head rotates counterclockwise, whereby the teeth of the renovator combs at the lower points of revolution, move counter to the direction of travel of the machine. Thus the teeth attack the surface of the lawn sod from the top, thereby pressing downwardly against the resistance of the underlying earth crust 52, Fig. 6, as indicated by arrow 53. Opposed to this manner of attack, were the rotation reversed, the point of each tooth would obviously attack the lawn sod from the underside thereby tending to produce a detrimental lifting of the sod.

At 54 is a receptacle for rubbish, which latter tends to travel as suggested by the curved action lines in Fig. 4. Although the initial contact of the renovator teeth with the sod is downwardly, the lifting action of the teeth is exerted after these pass the lowermost point of revolution as indicated in Fig. 6. The high peripheral speed of the renovator head causes the teeth to create an upward suction which assists the combing or brushing action thereof to erect the grass blades and to hold these momentarily in a favorable position to be clipped by the sickle knives.

Whereas this invention is here illustrated and described with respect to a specific embodiment thereof, it is to be understood that various changes may be made in said embodiment and that the generic inventive concepts involved may be embodied in various different forms by those skilled in the art, without departing from the invention as defined by the following claims.

What is claimed is:

1. A lawn renovating machine, comprising a rotatable, single axis renovator head provided with a comb of axially spaced finger teeth arranged radially thereof; a substantially plane sickle cutter co-operatively disposed substantially perpendicular to a radius and located radially within the operative zone of said finger teeth, the radial distance to the tips of said rigid finger teeth being at least greater than is the radial distance to the cutting edge of said sickle bar; a wheeled frame in which said renovator head is operatively mounted; and a source of power disposed to rotate said renovator head.

2. A lawn renovating machine according to claim 1, wherein a plurality of finger-teeth combs are arranged in angular alternation with an equal plurality of sickle cutters about the axis of rotation of said renovator head.

3. A lawn renovating machine according to claim 1, wherein said renovator head is eccentric with respect to the wheels of said frame; and means operative to fix the position of the renovator head relative to said wheels.

4. A renovator head for lawn renovating machines, comprising a rotatable structure adapted for mounting axially in bearings in a lawn renovating machine; said rotatable structure consisting of a plurality of comb fingers with tips spaced axially and extending radially thereof; and a substantially plane sickle cutter extending axially of said rotatable structure and perpendicular to a radius thereof, said sickle cutter having its cutting edge disposed within the peripheral surface described by the operation of said finger tips and being angularly spaced apart from the finger tips.

5. A lawn renovating machine, comprising a rotatable renovator head provided with a comb of axially spaced finger teeth having root crown penetrating points fixed radially thereof; a substantially plane sickle cutter disposed perpendicular to a radius and located radially within the operative surface described by said root crown penetrating points; a wheeled frame in which said renovator head is operatively mounted; and a source of power disposed to rotate said renovator head.

ALVIN B. BATCHELDER.

REFERENCES CITED

The following references are of record in the file of this patent:

UNITED STATES PATENTS

| Number | Name | Date |
| --- | --- | --- |
| 678,461 | Egan | July 16, 1901 |
| 1,538,381 | Bull | May 19, 1925 |
| 2,034,505 | Cline | Mar. 17, 1936 |
| 2,056,369 | Roessel | Oct. 6, 1936 |

FOREIGN PATENTS

| Number | Country | Date |
| --- | --- | --- |
| 15,930 | Great Britain | A. D. 1909 |